(12) United States Patent
Jin

(10) Patent No.: US 6,679,321 B2
(45) Date of Patent: Jan. 20, 2004

(54) HEAT PUMP SYSTEM

(76) Inventor: Keum Su Jin, Room 401 Jupung Village, 316-8, Kil-Dong, Kangdong-Ku, Seoul (KR)

( * ) Notice: Subject to any disclaimer, the term of this patent is extended or adjusted under 35 U.S.C. 154(b) by 0 days.

(21) Appl. No.: 10/200,835

(22) Filed: Jul. 22, 2002

(65) Prior Publication Data

US 2003/0042014 A1 Mar. 6, 2003

(30) Foreign Application Priority Data

Aug. 31, 2001 (KR) ........................................ 2001-53085

(51) Int. Cl.[7] ................................................ F25B 13/00
(52) U.S. Cl. ....................... 165/236; 62/238.7; 62/324.6
(58) Field of Search ......................... 165/236; 62/238.6, 62/238.7, 324.1, 324.6

(56) References Cited

U.S. PATENT DOCUMENTS

| | | | | |
|---|---|---|---|---|
| 4,182,406 A | * | 1/1980 | Holbrook et al. | .......... 165/48.2 |
| 4,437,321 A | * | 3/1984 | Asai | .......................... 62/324.2 |
| 4,796,439 A | * | 1/1989 | Yamada et al. | ................ 62/159 |
| 4,843,832 A | * | 7/1989 | Yamada et al. | ................ 62/159 |
| 4,869,074 A | | 9/1989 | Hoshi et al. | |
| 5,678,420 A | * | 10/1997 | Fukushima et al. | ......... 62/238.6 |
| 6,050,102 A | | 4/2000 | Jin | |
| 6,357,246 B1 | | 3/2002 | Jin | |

FOREIGN PATENT DOCUMENTS

| | | |
|---|---|---|
| JP | 49-18927 | 5/1974 |
| JP | 54-45949 | 4/1979 |
| JP | 55-5017 | 2/1980 |

* cited by examiner

Primary Examiner—William E. Tapolcai
(74) Attorney, Agent, or Firm—Hedman & Costigan, P.C.

(57) ABSTRACT

A heat pump system using air as its heat source is disclosed. In this system, the refrigeration circuit consists of both a main refrigerant line and a refrigerant suction line. A heat accumulator, containing both a heat medium and a heat storage phase change material, is mounted on the refrigerant line at a position between the cooling mode and heating mode expansion valves. A heat-dissipating heat exchanger is mounted on the main refrigerant line, and is set in the accumulator. A subsidiary heat exchanger is installed around the inlet port of the outdoor heat exchanger, and is connected to the heat accumulator through heat medium lines with a circulating pump. The system also has a heat pipe consisting of both an evaporating part installed at the periphery of the heat-dissipating heat exchanger, and a heat dissipating part installed at the periphery of the heat accumulator and connected to the evaporating part through a connection pipe. First and second heat-absorbing heat exchangers are connected to the refrigerant suction line in parallel to each other such that the first and second heat-absorbing heat exchangers are respectively set in the heat dissipating part and the heat accumulator, and selectively operated in accordance with the temperature of refrigerant flowing through the suction line to be returned to the compressor.

5 Claims, 2 Drawing Sheets

HEAT PUMP SYSTEM

BACKGROUND OF THE INVENTION

1. Field of the Invention

The present invention relates, in general, to heat pump systems and, more particularly, to a heat pump system that uses air as its heat source.

2. Description of the Prior Art

As well known to those skilled in the art, a heat pump system is an air conditioning machine that is selectively used as a heater or a cooler by changing the refrigerant flowing direction in the system, as desired. That is, in a conventional heat pump system, a main refrigerant line starting from the outlet port of a compressor extends while sequentially connecting a four-way valve, an indoor heat exchanger, two expansion valves, and an outdoor heat exchanger to each other, prior to being ended at the four-way valve. In addition, the four-way valve is also connected to the inlet port of the compressor through a refrigerant suction line. During a heating mode operation of the heat pump system, the four-way valve controls the refrigerant flowing direction in the main refrigerant line such that high pressure and high temperature gas refrigerant outputted from the compressor flows to the indoor heat exchanger, which acts as a condenser for condensing the gas refrigerant while transmitting heat from the gas refrigerant to indoor air or water flowing around the indoor heat exchanger, thus heating the indoor air or producing hot water while condensing the gas refrigerant. In such a case, the heat pump system performs a heating, drying or hot water producing function. The high pressure and high temperature liquid refrigerant outputted from the indoor heat exchanger is expanded in the heating mode expansion valve. The refrigerant from the expansion valve is, thereafter, evaporated by heat at the outdoor heat exchanger acting as an evaporator using outdoor air as a heat source. At the outdoor heat exchanger, the liquid refrigerant thus becomes low pressure and low temperature gas refrigerant, which is returned to the compressor so as to accomplish one cycle. During the heating mode operation, the heat pump system repeats the above-mentioned cycle.

During a cooling mode operation of the heat pump system, the four-way valve controls the refrigerant flowing direction in the main refrigerant line such that the high pressure and high temperature gas refrigerant outputted from the compressor flows to the outdoor heat exchanger, which acts as a condenser for condensing the gas refrigerant while transmitting heat from the gas refrigerant to outdoor air used as a heat source of the condenser. At the outdoor heat exchanger, the high pressure and high temperature gas refrigerant thus becomes high pressure and high temperature liquid refrigerant, which is outputted to the cooler-mode expansion valve so as to be expanded in the expansion valve. The liquid refrigerant from the cooling mode expansion valve is evaporated by heat transmitted from indoor air or water, at the indoor heat exchanger acting as an evaporator. In such a case, due to the evaporation of the refrigerant at the indoor heat exchanger, the refrigerant absorbs heat from the indoor air or water flowing around the indoor heat exchanger, thus cooling the indoor air or producing cold water. At the indoor heat exchanger, the refrigerant thus becomes low pressure and low temperature gas refrigerant, which is returned to the compressor so as to accomplish one cycle. During the cooling mode operation, the heat pump system repeats the above-mentioned cycle.

During an evaporation of the liquid refrigerant using heat of outdoor air at the outdoor heat exchanger in a heating mode operation of the conventional heat pump system, moisture laden in the outdoor air may be frozen on the external surface of the outdoor heat exchanger when the temperature of the outdoor air is excessively low. In such a case, the frost formed on the external surface of the outdoor heat exchanger reduces the evaporation effect of the liquid refrigerant, thus remarkably reducing the heating capacity of the heat pump system. Therefore, the technique of promoting the evaporation of liquid refrigerant at the outdoor heat exchanger or promoting the evaporation of gas refrigerant inputted into the compressor of heat pump systems has been actively studied.

For example, Japanese Patent Laid-open Publication No. Sho. 54-45949 discloses an air conditioning apparatus, with a refrigerant heater installed on the refrigerant line of the apparatus and used as an evaporator during a heating mode operation of the apparatus. In a heating mode operation of the above Japanese air conditioning apparatus, high pressure and high temperature refrigerant outputted from a compressor is condensed at an indoor heat exchanger while heating indoor air. The refrigerant is, thereafter, dropped in its pressure at a heating mode pressure reducer, and evaporated at the refrigerant heater. Therefore, this air conditioning apparatus is not deteriorated in its heating capacity even when the apparatus is operated as a heater in cold outdoor air. In addition, Japanese Patent Publication No. Sho. 55-5017 discloses a heat pump type air conditioning apparatus, which has a plurality of outdoor heat exchangers, and a flow control unit. The flow control unit switches the refrigerant flow between a first cycle, in which the outdoor heat exchangers act as condensers at the same time in the case of a cooling mode operation, and act as evaporators at the same time in the case of a heating mode operation, and a second cycle, in which a part of high temperature gas refrigerant directly flowing from a compressor to an indoor heat exchanger is fed to the outdoor heat exchangers so as to allow one of the outdoor heat exchangers to alternately act as a condenser and an evaporator and, at the same time, allow the other outdoor heat exchanger to alternately act as an evaporator and a condenser. Another example of conventional heat pump systems is referred to U.S. Pat. No. 6,050,102, allowed to the inventor of the present invention and entitled "heat pump type air conditioning apparatus". This heat pump type air conditioning apparatus comprises a compressor, a four-way valve, an indoor heat exchanger, a cooling mode capillary tube used as a pressure reducer, a heating mode capillary tube used as a pressure reducer, and an outdoor heat exchanger connected to each other by both a first refrigerant line and a gas refrigerant suction line. The above heat pump type air conditioning apparatus also has a first heat exchanger and a second heat exchanger. The first heat exchanger is installed on the first refrigerant line at a position between the indoor heat exchanger and the heating mode capillary tube. The second heat exchanger is installed on the first refrigerant line at a position between the outdoor heat exchanger and the four-way valve such that the second heat exchanger is positioned higher than the first heat exchanger. The second heat exchanger is also connected to the first heat exchanger through a connection line having an on-off valve, such that the first and second heat exchangers form a closed circuit. The first and second heat exchangers contain actuation fluid therein and vaporize both the remaining liquid refrigerant and incompletely vaporized gas refrigerant from the outdoor heat exchanger using the actuation fluid heated and vaporized by liquid refrigerant from the indoor heat exchanger.

In an operation of such a conventional heat pump system, liquid or gas refrigerant is evaporated or condensed at the outdoor heat exchanger using heat of outdoor air, and so the thermal capacity of the system is determined by the quantity of heat transmitted at the indoor heat exchanger. Typically, it has been well known to those skilled in the art that the heat exchanging surface area of the outdoor heat exchanger, determining the thermal capacity of the system, is set to about 1.2 to 1.4 times larger than that of the indoor heat exchanger.

In Japanese Patent Laid-open Publication No. Sho. 54-45949, it is described that a refrigerant heater is installed on the refrigerant line, and is used as an evaporator during a heating mode operation. However, this Japanese patent does not disclose the technical construction of the refrigerant heater in detail. Due to an intrinsic structural limitation of typical evaporators, it is inevitable that the refrigerant heater has a structure, limiting the volume of the refrigerant heater and allowing an easy installation of the refrigerant heater in an air conditioning apparatus. However, such a structure of the refrigerant heater undesirably increases the maintenance cost of the air conditioning apparatus. The heat pump type air conditioning apparatus disclosed in Japanese Patent Publication No. Sho. 55-5017 is disadvantageous as follows: That is, this apparatus is designed such that the external surface of the outdoor heat exchanger is defrosted by heat of a part of high pressure and high temperature output refrigerant of a compressor during a heating mode operation in cold outdoor air. Therefore, it is necessary to use a large capacity compressor, which undesirably increases the production cost and maintenance cost of the apparatus. The heat pump type air conditioning apparatus of U.S. Pat. No. 6,050,102, allowed to the inventor of this invention, is problematic in that liquid refrigerant cannot be desirably evaporated at the outdoor heat exchanger when the temperature of outdoor air is low, and it is necessary to use an additional heater for heating refrigerant at the outdoor heat exchanger during an operation in the coldest weather, and so the apparatus has a complicated construction and high production and maintenance costs. Furthermore, during a heating mode operation of the conventional heat pump type air conditioning apparatuses in the coldest weather, liquid refrigerant cannot be desirably or completely vaporized at the outdoor heat exchanger, and so the coefficient of performance (COP) of such air conditioning apparatuses is reduced. Such a reduction in COP results in a degradation of thermal efficiency of the apparatuses.

During a cooling mode operation of the conventional heat pump systems in hot outdoor air, there is only a small difference in the temperature between the outdoor air and gas refrigerant to be condensed at the outdoor heat exchanger, and so the gas refrigerant may be incompletely condensed at the outdoor heat exchanger. In such a case, the liquid refrigerant may be incompletely vaporized at the indoor heat exchanger when the cooling load imposed on the indoor heat exchanger acting as an evaporator during such a cooling mode operation is reduced. Therefore, there occurs a liquid back, in which refrigerant in the form of wet vapor is returned to the compressor and sometimes causes damage to the valve of the compressor. In the case of occurrence of such a liquid back, there occurs a liquid hammer in the compressor while compressing the refrigerant in the form of wet vapor. A reduction in COP may occur, and in addition the compressor may be severely damaged or broken.

Such problems experienced in the conventional heat pump systems may be overcome by increasing the thermal capacity of outdoor heat exchangers. However, such an increase in the thermal capacity of the outdoor heat exchangers undesirably increases the production cost, and requires an enlarged installation area of the systems.

SUMMARY OF THE INVENTION

Accordingly, the present invention has been made keeping in mind the above problems occurring in the prior art, and an object of the present invention is to provide a heat pump system, which effectively and completely vaporizes liquid refrigerant at its outdoor heat exchanger during a heating mode operation in cold outdoor air, and effectively completely condenses gas refrigerant at its indoor heat exchanger during a cooling mode operation in hot outdoor air, thus increasing COP.

Another object of the present invention is to provide a heat pump system, which completely vaporizes the wet vapor refrigerant returned to a compressor, thus changing the phase of the input refrigerant of the compressor to a dry vapor phase or a superheated vapor phase.

In order to accomplish the above objects, the present invention provides a heat pump system, comprising: a basic refrigeration circuit consisting of: a main refrigerant line starting from a compressor, and extending while sequentially connecting a four-way valve, an indoor heat exchanger, a cooling mode expansion valve, a heating mode expansion valve and an outdoor heat exchanger to each other, prior to being ended at the four-way valve; and a refrigerant suction line extending from the four-way valve to the compressor; a heat accumulator containing both a heat medium and a heat storage phase change material therein, and mounted on the main refrigerant line at a position between the cooling mode expansion valve and the heating mode expansion valve; a heat-dissipating heat exchanger mounted on the main refrigerant line, and set in the accumulator by allowing the main refrigerant line to pass through the heat accumulator; a subsidiary heat exchanger installed at a position around the inlet port of the outdoor heat exchanger and connected to the heat accumulator through heat medium feed and return lines, with a circulating pump mounted on the heat medium return line; a heat pipe consisting of: an evaporating part installed at the periphery of the heat-dissipating heat exchanger; and a heat dissipating part installed at the periphery of the heat accumulator, and connected to the evaporating part through a connection pipe; and first and second heat-absorbing heat exchangers connected to the refrigerant suction line in parallel to each other such that the first heat-absorbing heat exchanger is set in the heat dissipating part, and the second heat-absorbing heat exchanger is set in the heat accumulator, the first and second heat-absorbing heat exchangers being selectively operated in accordance with the temperature of refrigerant flowing through the suction line to be returned to the compressor.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
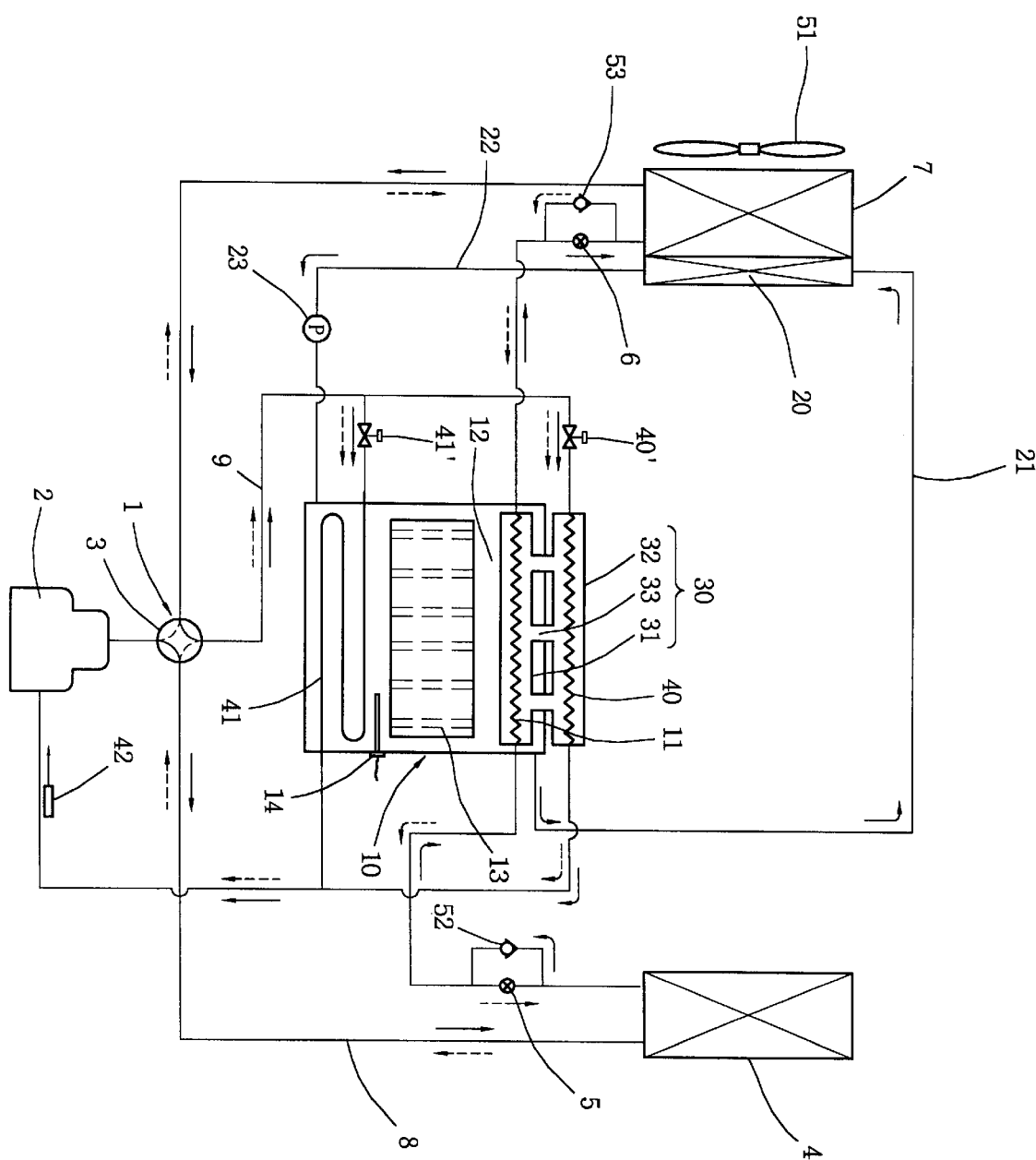
FIG. 1 is a diagram, showing the construction of a heat pump system in accordance with the preferred embodiment of the present invention.

Reference should now be made to the drawings, in which the same reference numerals are used throughout the different drawings to designate the same or similar components.

FIG. 1 is a diagram, showing the construction of a heat pump system in accordance with the preferred embodiment of the present invention. In the drawing, the reference numeral 1 denotes a basic refrigeration circuit of this system. In order to form the basic refrigeration circuit 1, a main refrigerant line 8 starting from the outlet port of a compressor 2 extends while sequentially connecting a four-way valve 3, an indoor heat exchanger 4, a cooling mode expansion valve 5, a heating mode expansion valve 6 and an outdoor heat exchanger 7 to each other, prior to being ended at the four-way valve 3. In addition, a refrigerant suction line 9 extends from the four-way valve 3 to the inlet port of the compressor 2. During a heating mode operation of the heat pump system, the indoor heat exchanger 4 acts as a condenser, while the outdoor heat exchanger 7 acts as an evaporator. During a cooling mode operation of the heat pump system, the outdoor heat exchanger 7 acts as a condenser, while the indoor heat exchanger 4 acts as an evaporator.

The reference numeral 10 denotes a heat accumulator containing a heat medium 12 therein. This heat accumulator 10 is installed on the main refrigerant line 8 at a position between the cooling mode expansion valve 5 and the heating mode expansion valve 6. In such a case, the refrigerant line 8 passes through the heat accumulator 10 such that a heat-dissipating heat exchanger 11 mounted on the refrigerant line 8 is set in the accumulator 10. A heat storage phase change material 13 is contained in the heat accumulator 10 such that the material 13 lengthens the heat accumulating time of the heat medium 12, and maintains the temperature of heat stored in the heat medium 12 for a desired period of time. Installed at the sidewall of the heat accumulator 10 is a heater 14 which selectively heats the heat medium 12 when necessary.

The heat storage phase change material 13 contained in the heat accumulator 10 is selected from known materials, such as sulfate, nitrate, phosphate, carbonate and paraffin, and is changed in its phase at a temperature ranging from 27° C. to 30°.

The reference numeral 20 denotes a subsidiary heat exchanger. This heat exchanger 20 is installed such that it is integrated with the inlet port of the outdoor heat exchanger 7 or is placed at a position adjacent to the inlet port of the outdoor heat exchanger 7. A circulating pump 23 is mounted on the heat medium return line 22. During a heating mode operation of the heat pump system at a low outdoor temperature of not higher than 5° C., the heat-dissipating heat exchanger 11 dissipates heat. In such a case, heat from the heat exchanger 11 heats the heat medium 12, and is stored in the heat storage phase change material 13. The heated medium 12 is also circulated through two heat medium circulating lines, that is medium feed and return lines 21 and 22, by the circulation force of the pump 23, thus passing through the subsidiary heat exchanger 20 while preheating outdoor air sucked into the outdoor heat exchanger 7 before the outdoor air reaches the outdoor heat exchanger 7. Therefore, it is possible to prevent the external surface of the outdoor heat exchanger 7 from being frozen or to defrost the external surface of the outdoor heat exchanger 7. During a cooling mode operation of the heat pump system at a high outdoor temperature of not lower than a predetermined reference point, for example, about 30° C., the heat medium 12 is circulated through the lines 21 and 22 by the circulation force of the pump 23 while cooling outdoor air sucked into the outdoor heat exchanger 7 before the outdoor air reaches the heat exchanger 7. Therefore, it is possible for the outdoor heat exchanger 7 to effectively and desirably condense gas refrigerant.

Figure 2:
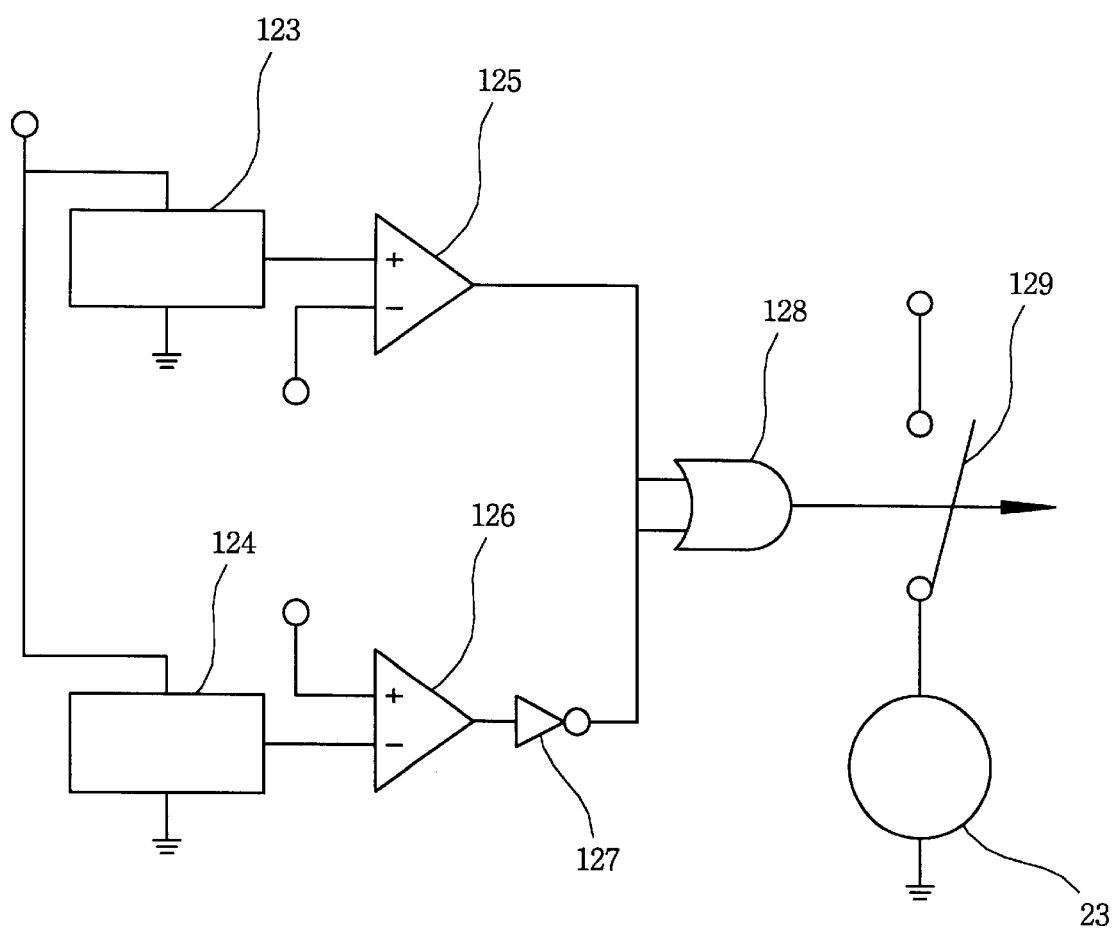
FIG. 2 is a circuit diagram, showing the construction of a control circuit for controlling a circulating pump included in the system of this invention.

FIG. 2 is a circuit diagram, showing the construction of a control circuit for controlling the circulating pump 23 included in the system of this invention. As shown in FIG. 2, this control circuit comprises a high temperature sensor 123 and a low temperature sensor 124, which are installed at positions around, for example, the inlet port of the outdoor heat exchanger 7 and output temperature signals. The control circuit also has a first comparator 125, a second comparator 126, an inverter 127, an OR gate 128, and a switch 129. The first comparator 125 receives a reference voltage signal indicating a reference high outdoor temperature, for example, 30° C., at its negative terminal, and receives a voltage signal from the high temperature sensor 123 at its positive terminal, prior to comparing the voltages of the two input signals with each other and outputting a logic signal indicating a voltage comparison result. The second comparator 126 receives a reference voltage signal indicating a reference low outdoor temperature, for example, 5° C., at its positive terminal, and receives a voltage signal from the low temperature sensor 124 at its negative terminal, prior to comparing the voltages of the two input signals with each other and outputting a logic signal indicating a voltage comparison result. The inverter 127 receives the logic signal outputted from the second comparator 126, and inverts the logic state of the logic signal prior to outputting the signal to the OR gate 128. The OR gate 128 receives a signal outputted from the first comparator 125 or the inverter 127, and performs an OR operation prior to outputting an OR operation result. The switch 129 is turned on when the OR operational result of the OR gate 128 is logic high, and so the switch 129 electrically activates and starts the circulating pump 23.

The reference numeral 30 denotes a heat pipe, in which an evaporating part 31 is connected to a heat dissipating part 32 through a connection pipe 33. The evaporating part 31 of the heat pipe 30 is installed at the peripheral edge of the heat-dissipating heat exchanger 11, while the heat dissipating part 32 is installed at the peripheral edge of the heat accumulator 10. The above heat pipe 30 contains therein an actuation fluid, such as distilled water or alcohol, under vacuum.

The reference numerals 40 and 41 denote first and second heat-absorbing heat exchangers, respectively. The two heat-absorbing heat exchangers 40 and 41 are connected to the refrigerant suction line 9 in parallel to each other such that the first heat-absorbing heat exchanger 40 is set in the heat dissipating part 32, and the second heat-absorbing heat exchanger 41 is set in the heat accumulator 10. Two solenoid valves 40' and 41' are respectively mounted at the inlet ports of the first and second heat-absorbing heat exchangers 40 and 41, and are controllably opened in response to signals outputted from an additional temperature sensor 42 provided on the refrigerant suction line 9 at a position around the inlet port of the compressor 2. The first solenoid valve 40' is opened when the temperature of wet vapor refrigerant flowing from an evaporator to the compressor 2 is not lower than a predetermined reference point, for example, 12° C. In such a case, the wet vapor refrigerant is heated by heat of condensation dissipated from the actuation fluid at the heat dissipating part 32, thus being slightly increased in its temperature. The second solenoid valve 41' is opened when the temperature of wet vapor refrigerant flowing to the compressor 2 is lower than the predetermined reference point, for example, 12° C. In such a case, the wet vapor refrigerant is heated by heat stored in the heat medium at the second heat-absorbing heat exchanger 41, thus being largely increased in its temperature. Therefore, it is possible to change the phase of wet vapor refrigerant to a dry vapor phase or a superheated vapor phase before the refrigerant is returned to the compressor 2.

In the drawings, the reference numeral 51 denotes a fan, and the numerals 52 and 53 denote check valves.

In order to operate the above heat pump system in a heating mode, the four-way valve 3 is manipulated to allow output refrigerant of the compressor 2 to flow through the refrigerant lines along a direction as shown by the solid arrows of the drawings, prior to starting the compressor 2. When starting the compressor 2, high pressure and high temperature output gas refrigerant from the compressor 2 is guided into the indoor heat exchanger 4 acting as a condenser. At the indoor heat exchanger 4, the refrigerant is condensed while heating surrounding fluid using heat of condensation, thus producing hot water or heating indoor air. The high pressure and high temperature liquid refrigerant outputted from the indoor heat exchanger 4 passes through the first check valve 52 and is, thereafter, guided to the heat-dissipating heat exchanger 11 set in the heat accumulator 10. At the heat-dissipating heat exchanger 11, the refrigerant evaporates the actuation fluid contained in the evaporating part 31 of the heat pipe 30 and, at the same time, heats the heat medium 12. The liquid refrigerant in the heat exchanger 11 is thus supercooled. The supercooled liquid refrigerant is, thereafter, expanded at the heating mode expansion valve 6, prior to being guided into the outdoor heat exchanger 7 acting as an evaporator. At the outdoor heat exchanger 7 using outdoor air as its heat source, the refrigerant is evaporated by heat of the outdoor air. The low pressure and low temperature gas refrigerant outputted from the outdoor heat exchanger 7 primarily passes through the four-way valve 3, and secondarily passes through either of the first and second heat-absorbing heat exchangers 40 and 41 which are parallely connected to the refrigerant suction line 9 and are respectively set in the heat dissipating part 32 of the heat pipe 30 and the heat accumulator 10. When the refrigerant passes through either of the first and second heat-absorbing heat exchangers 40 and 41, the refrigerant is heated by heat of condensation of the actuation fluid or heat stored in the heat medium, thus being changed in its phase to a dry vapor phase or a superheated vapor phase. The refrigerant in the dry vapor phase or superheated vapor phase is returned to the compressor 2, thus accomplishing one cycle of the heating mode operation.

In order to operate the above heat pump system in a cooling mode, the four-way valve 3 is manipulated to allow output refrigerant of the compressor 2 to flow through the refrigerant lines along a direction as shown by the dotted arrows of the drawings, prior to starting the compressor 2. When starting the compressor 2, high pressure and high temperature output gas refrigerant from the compressor 2 is guided into the outdoor heat exchanger 7 acting as a condenser. At the outdoor heat exchanger 7, the refrigerant is condensed. The high pressure and high temperature liquid refrigerant outputted from the outdoor heat exchanger 7 passes through the second check valve 53 and is thereafter expanded at the cooling mode expansion valve 5, prior to being guided into the indoor heat exchanger 4 acting as an evaporator. At the indoor heat exchanger 4, the refrigerant is evaporated by heat of evaporation absorbed from surrounding fluid, thus cooling the surrounding fluid. The refrigerant at the indoor heat exchanger 4 thus produces cold water or cooling indoor air. The low pressure and low temperature gas refrigerant outputted from the indoor heat exchanger 4 primarily passes through the four-way valve 3, and is returned to the compressor 2 through the refrigerant suction line 9, thus accomplishing one cycle of the cooling mode operation. During such a cooling mode operation of the heat pump system, the heat-dissipating heat exchanger 11 and the first and second heat-absorbing heat exchangers 40 and 41 perform the same functions as those described for the heating mode operation.

When liquid refrigerant is supercooled at the heat-dissipating heat exchanger 11 during such a heating or cooling mode operation of the heat pump system, heat of condensation of the refrigerant is dissipated to evaporate the actuation fluid contained in the evaporating part 31 of the heat pipe 30, as well as heat the heat medium 12. When the temperature of the heat medium 12 exceeds a reference temperature range, for example, 27~30° C., which is the phase change temperature range of the heat storage phase change material 13 contained in the heat accumulator 10, the heat storage phase change material 13 is changed in its phase to a liquid phase, thus absorbing and storing heat of melting therein. However, when the temperature of the heat medium 12 does not exceed the phase change temperature range of the heat storage phase change material 13, the material 13 is changed in its phase to a solid phase, thus dissipating heat of solidification to the heat medium 12. It is thus possible to maintain the temperature of the heat medium 12 at a constant point. During a heating mode operation of the heat pump system at a low outdoor temperature of not higher than 5° C., the output signal from the low temperature sensor 124 is transmitted to the negative terminal of the second comparator 126. The second comparator 126 also receives a reference voltage signal, indicating a reference low outdoor temperature, at its positive terminal, and, thereafter, compares the voltages of the two input signals with each other, and outputs a low-level logic signal "0". The inverter 127 receives the logic signal outputted from the second comparator 126, and inverts the logic state of the logic signal prior to outputting the signal to the OR gate 128. Upon receiving the signal from the inverter 127, the OR gate 128 performs an OR operation, prior to outputting an OR operation result to turn on the switch 129 and start the circulating pump 23. When the pump 23 is started as described above, the heat medium 12, contained in the heat accumulator 10 and heated by heat of solidification dissipated from the heat storage phase change material 13, is fed to the subsidiary heat exchanger 20. At the subsidiary heat exchanger 20, the heat medium 12 preheats outdoor air sucked into the inlet port of the outdoor heat exchanger 7 before the outdoor air reaches the outdoor heat exchanger 7. Therefore, the heat pump system of this invention effectively prevents the outdoor heat exchanger 7 from being frozen or effectively defrosts the heat exchanger 7 even in the case of a heating mode operation in cold outdoor air. It is thus possible to accomplish effective evaporation of liquid refrigerant at the outdoor heat exchanger 7 during such a heating mode operation. When the outdoor temperature is increased to exceed 5° C. during the heating mode operation of the heat pump system, the circulating pump 23 is stopped, thus stopping the process of preheating the outdoor air at the inlet port of the outdoor heat exchanger 7. In addition, when the temperature of the heat medium 12 is reduced to a point not higher than a predetermined reference point due to stoppage of the heat pump system, the heater 14 starts to heat the heat medium 12.

During a cooling mode operation of the heat pump system at a high outdoor temperature of not lower than 30° C., the output signal from the high temperature sensor 123 is transmitted to the positive terminal of the first comparator 125. The first comparator 125 also receives a reference voltage signal, indicating a reference high outdoor temperature, at its negative terminal, and, thereafter, compares the voltages of the two input signals with each other, and outputs a high-level logic signal "1" to the OR gate 128. Upon receiving the signal from the first comparator 125, the OR gate 128 performs an OR operation, prior to outputting an OR operation result to selectively turn on the switch 129 and start the circulating pump 23. When the pump 23 is started as described above, the heat medium 12, contained in the heat accumulator 10, is fed to the subsidiary heat exchanger 20. At the subsidiary heat exchanger 20 provided at the inlet port of the outdoor heat exchanger 7, the heat medium 12 cools outdoor air before the outdoor air reaches the outdoor heat exchanger 7. Therefore, it is possible to enlarge the gap between the condensation temperature of the gas refrigerant and the temperature of the outdoor air at the outdoor heat exchanger 7, thus accomplishing effective condensation of the gas refrigerant at the outdoor heat exchanger 7 during such a cooling mode operation. When the outdoor temperature is reduced to a point lower than 30° C. during the cooling mode operation, the circulating pump 23 is stopped, thus stopping the process of cooling the outdoor air at the inlet port of the outdoor heat exchanger 7.

In the preferred embodiment, the reference temperature of the output temperature signal from the high temperature sensor 123 during a cooling mode operation is set to, for example, 30° C. However, it should be understood that said reference temperature may be changed to be increased or reduced in accordance with a variation in the size of the heat exchanging surface of the outdoor heat exchanger 7 or the environmental conditions. In such a case, the change in said reference temperature will be accompanied by a change in the phase change temperature range of the heat storage phase change material 13.

When the temperature of wet vapor refrigerant, flowing from the outdoor or indoor heat exchanger 7 or 4 acting as an evaporator to the compressor 2 during a heating or cooling mode operation of the system, is lower than a predetermined reference point, for example, 12° C., the second solenoid valve 41' is opened in response to a signal outputted from the additional temperature sensor 42 which is provided on the refrigerant suction line 9 at a position around the inlet port of the compressor 2. Therefore, the wet vapor refrigerant is heated by the heat medium while passing through the second heat-absorbing heat exchanger 41. When the temperature of said wet vapor refrigerant is not lower than the predetermined reference point, for example, 12° C., the first solenoid valve 40' is opened in response to a signal outputted from the additional temperature sensor 42. Therefore, the wet vapor refrigerant is heated by heat of condensation of the actuation fluid at the heat dissipating part 32 of the heat pipe 30. It is thus possible to change the wet vapor phase of return refrigerant to a dry vapor phase or a superheated vapor phase, and this allows the system to avoid liquid back or liquid hammer.

In a brief description, the heat pump system of this invention effectively evaporates liquid refrigerant at the outdoor heat exchanger during a heating mode operation in cold outdoor air, and effectively condenses gas refrigerant at the outdoor heat exchanger during a cooling mode operation in hot outdoor air. The system also changes the wet vapor phase of refrigerant flowing to the compressor to a dry vapor phase or a superheated vapor phase, thus improving its operational reliability.

As described above, the present invention provides a heat pump system, in which a heat accumulator is installed on the refrigerating circuit at a position between a cooling mode expansion valve and a heating mode expansion valve. In the heat accumulator, a heat medium is heated by heat of condensation of gas refrigerant condensed at the indoor or outdoor heat exchanger acting as a condenser, and is fed to a subsidiary heat exchanger provided at the inlet port of the outdoor heat exchanger, thus preheating or cooling outdoor air before the air completely reaches the outdoor heat exchanger. Therefore, it is possible to accomplish effective evaporation of liquid refrigerant at the outdoor heat exchanger during a heating mode operation in cold outdoor air, and to accomplish effective condensation of gas refrigerant at the outdoor heat exchanger during a cooling mode operation in hot outdoor air. In addition, wet vapor refrigerant flowing to the compressor is heated by the heat medium and an actuation fluid of a heat pipe, and so it is possible to change the wet vapor phase of return refrigerant to a dry vapor phase or a superheated vapor phase, and allow the system to avoid liquid back or liquid hammer. The heat pump system thus improves COP irrespective of wide variations in the temperature of outdoor air, thus maintaining its desired thermal efficiency in all seasons.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:
1. A heat pump system, comprising:
   a basic refrigeration circuit consisting of:
      a main refrigerant line starting from a compressor, and extending while sequentially connecting a four-way valve, an indoor heat exchanger, a cooling mode expansion valve, a heating mode expansion valve and an outdoor heat exchanger to each other, prior to being ended at said to four-way valve; and
      a refrigerant suction line extending from said four-way valve to said compressor;
   a heat accumulator containing both a heat medium and a heat storage phase change material therein, and mounted on the main refrigerant line at a position between said cooling mode expansion valve and said heating mode expansion valve;
   a heat-dissipating heat exchanger mounted on said main refrigerant line, and set in said accumulator by allowing the main refrigerant line to pass through the heat accumulator;
   a subsidiary heat exchanger installed at a position around an inlet port of said outdoor heat exchanger and connected to said heat accumulator through heat medium feed and return lines, with a circulating pump mounted on said heat medium return line;
   a heat pipe consisting of:
      an evaporating part installed at a periphery of said heat-dissipating heat exchanger; and
      a heat dissipating part installed at a periphery of said heat accumulator, and connected to said evaporating part through a connection pipe; and
   first and second heat-absorbing heat exchangers connected to said refrigerant suction line in parallel to each other such that the first heat-absorbing heat exchanger is set in said heat dissipating part, and the second heat-absorbing heat exchanger is set in said heat accumulator, said first and second heat-absorbing heat exchangers being selectively operated in accordance with a temperature of refrigerant flowing through the suction line to be returned to the compressor.

2. The heat pump system according to claim 1, wherein said circulating pump is operated when outdoor air has a temperature of not higher than 5° C. or not lower than 30° C.

3. The heat pump system according to claim 1, wherein said circulating pump is controlled by a control circuit, said control circuit comprising:

a high temperature sensor and a low temperature sensor installed at positions around the inlet port of said outdoor heat exchanger and outputting temperature signals;

a first comparator receiving both a reference voltage signal indicating a reference high outdoor temperature at a negative terminal thereof, and a voltage signal outputted from the high temperature sensor at a positive terminal thereof, and comparing voltages of the input signals with each other, and outputting a logic signal indicating a result of the voltage comparison;

a second comparator receiving both a reference voltage signal indicating a reference low outdoor temperature at a positive terminal thereof, and a voltage signal from the low temperature sensor at a negative terminal thereof, and comparing voltages of the input signals with each other, and outputting a logic signal indicating a result of the voltage comparison;

an inverter receiving the logic signal outputted from the second comparator so as to invert a logic state of said logic signal;

an OR gate receiving a signal outputted from said first comparator or from said inverter, and performing an OR operation, and outputting an OR operation result; and a switch turned on to electrically activate and start said circulating pump when said OR operational result is logic high.

4. The heat pump system according to claim 1, wherein said heat accumulator is provided with a heater.

5. The heat pump system according to claim 1, wherein a solenoid valve is provided at an inlet port of each of the first and second heat-absorbing heat exchangers, and is controllably opened in response to a signal outputted from an additional temperature sensor provided on the refrigerant suction line at a position around the inlet port of said compressor.

\* \* \* \* \*